US012709571B2

(12) United States Patent
Duvallet et al.

(10) Patent No.: US 12,709,571 B2
(45) Date of Patent: Aug. 18, 2026

(54) PRODUCTION OF ACTIVATED-BELITE-CSA CLINKERS AT EXTREMELY LOW FIRING TEMPERATURE

(71) Applicant: University of Kentucky Research Foundation, Lexington, KY (US)

(72) Inventors: Tristana Duvallet, Lexington, KY (US); Thomas Lee Robl, Sadieville, KY (US); Robert B. Jewell, Lexington, KY (US); Anne Elizabeth Oberlink, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 304 days.

(21) Appl. No.: 18/283,871

(22) PCT Filed: Mar. 17, 2022

(86) PCT No.: PCT/US2022/020727

§ 371 (c)(1),
(2) Date: Sep. 25, 2023

(87) PCT Pub. No.: WO2022/203932

PCT Pub. Date: Sep. 29, 2022

(65) Prior Publication Data

US 2024/0166561 A1 May 23, 2024

Related U.S. Application Data

(60) Provisional application No. 63/166,435, filed on Mar. 26, 2021.

(51) Int. Cl.

| | |
|---|---|
| ***C04B 7/345*** | (2006.01) |
| ***C04B 7/42*** | (2006.01) |
| ***C04B 28/02*** | (2006.01) |

(52) U.S. Cl.
CPC ............ *C04B 7/3453* (2013.01); *C04B 7/424* (2013.01); *C04B 28/025* (2013.01)

(58) Field of Classification Search
CPC ................................ C04B 7/424; C04B 2/025
See application file for complete search history.

(56) References Cited

U.S. PATENT DOCUMENTS

| | | | | |
|---|---|---|---|---|
| 4,319,927 | A * | 3/1982 | Segal | C04B 7/421 106/734 |
| 9,822,036 | B2 * | 11/2017 | Zhang | C04B 22/10 |
| 2012/0145045 | A1 * | 6/2012 | Walenta | C04B 28/025 106/459 |
| 2014/0311386 | A1 * | 10/2014 | Robl | C04B 7/323 106/693 |
| 2021/0238090 | A1 | 8/2021 | Duvallet | |

FOREIGN PATENT DOCUMENTS

| | | | |
|---|---|---|---|
| CN | 109369044 | A | 2/2019 |
| CN | 111646714 | A | 9/2020 |

* cited by examiner

*Primary Examiner* — Silvana C Runyan
(74) *Attorney, Agent, or Firm* — Stites & Harbison PLLC; Warren D. Schickli

(57) ABSTRACT

A raw meal for a cement clinker, a cement clinker made from that raw meal and a process for producing a cement clinker are provided. The clinker contains mainly the hydraulically activate alpha'H-belite polymorph and calcium sulfoaluminate (ye'elimite or $C_4A_3\acute{S}$), at the low firing temperature of 1050° C., using a combination of fluoride and boron oxide.

14 Claims, 4 Drawing Sheets

PRODUCTION OF ACTIVATED-BELITE-CSA CLINKERS AT EXTREMELY LOW FIRING TEMPERATURE

RELATED APPLICATION

This application is the national stage of international patent application no. PCT/US2022/020727 filed on Mar. 17, 2022, which in turn claims the benefit of U.S. Provisional Patent Application Ser. No. 63/166,435 filed Mar. 26, 2021, the full disclosure of which is hereby incorporated by reference.

GOVERNMENT SUPPORT

This invention was made with government support under Grant No. DE-AR0001146 awarded by the U.S. Department of Energy. The government has certain rights in the invention.

TECHNICAL FIELD

This document relates generally to the cement clinker field and, more particularly, to a new and improved raw meal for a cement clinker, a new and improved cement clinker made from that raw meal, to a new and improved process for producing a cement clinker, and to a new and improved cement/mortar material made from this cement clinker.

BACKGROUND

Cement Notation

| Chemical Formula | Cement Notation |
|---|---|
| CaO | C |
| $SiO_2$ | S |
| $Al_2O_3$ | A |
| $Fe_2O_3$ | F |
| $SO_3$ | Ś or $ |

| Names | Chemical Notation | Cement Notation |
|---|---|---|
| Tricalcium Silicate - Alite | $Ca_3SiO_5$ | $C_3S$ |
| Dicalcium Silicate - Belite | $Ca_2SiO_4$ | $C_2S$ |
| Tricalcium aluminate | $Ca_3Al_2O_4$ | $C_3A$ |
| Tetracalcium aluminoferrite - Ferrite | $Ca_4Al_nFe_{(2-n)}O_7$ | $C_4AF$ |
| Tetracalcium Trialuminate Sulfate - Ye'elimite - Klein's compound - CSA | $Ca_4Al_6(SO_4)O_{12}$ | $C_4A_3$$ or $C_4A_3$Ś |
| Dodecacalcium hepta-aluminate - Mayenite | $Ca_{12}Al_{14}O_{33}$ | $C_{12}A_7$ |
| Fluorellestadite | $Ca_{10}(SiO_4)_3(SO_4)_3F_2$ | $3C_2S.3C$.CaF_2$ |
| Fluormayenite | $Ca_{12}Al_{14}O_{32}F_2$ | $C_{11}A_7CaF_2$ |
| Ternesite | $Ca_5(SiO_4)_2SO_4$ | $C_5S_2$$ |
| Gehlenite | $Ca_2Al_2SiO_7$ | $C_2AS$ |
| Krotite | $CaAl_2O_4$ | CA |
| Anhydrite | $CaSO_4$ | C$ |
| Calcium Oxide - Free Lime | CaO | C |

One of the greatest challenges facing the world today is the reduction of carbon dioxide emissions, especially the $CO_2$ emissions released from the production of Ordinary Portland cement (OPC). Various alternative cements to OPC have been proposed over the last decade with reduced $CO_2$ emissions. The most viable binder to possibly replace the use of OPC should present the following characteristics:

- Incorporate substantial quantities of industrial by-products as opposed to natural resources
- Contain low $CO_2$ embodied clinker phases: for example, the production of alite releases 0.578 g $CO_2$ per g of raw materials, while the production of belite releases 0.511 g of $CO_2$ per g of raw materials, and 0.216 g for the production of ye'elimite.
- Be produced at lower firing temperatures: OPC is produced at 1450-1500° C., CSA cement can be produced at 1250° C.

From previous work, we have been able to demonstrate that alite-calcium sulfoaluminate (A/CSA) clinker can be produced at 1250° C. with novel mineralizers and fluxes, such as iron oxide and fluoride. A similar process can thus be used for the production of belite-calcium sulfoaluminate (B/CSA) clinker, with a lower firing temperature. The high firing temperature of 1250° C. was previously selected specifically for targeting the production of alite, however belite can be formed at much lower firing temperatures with the selection of adequate fluxes and mineralizers.

Belite presents five polymorphs α, $\alpha'_H$, $\alpha'_L$, β, and γ, which are a function of temperature. The polymorphs $\alpha'_H$ (high temperature) and $\alpha'_L$ (low temperature) are closely related in structure to the main α' polymorph. Each polymorph can be ordered from the highest to the lowest hydraulic reactivity: $\alpha'>\beta>\alpha>\gamma$. Also, the hydraulic reactivity of α-$C_2S$ may also lie between α'- and β-$C_2S$. Li et al. confirmed that the hydration of $\alpha'_H$ is more homogeneous than β, in terms of inner and outer hydrated products, which may explain the different hydraulic properties of each polymorph. As such, the high temperature polymorph $\alpha'_H$-$C_2S$ is sought in the final clinker compositions instead of β-$C_2S$, and crystal chemical composition and/or physical stabilization mechanisms have been examined.

Although, the adding of doping agents makes the belite phase less reactive at early age, these additions improve the mechanical strength at later ages. In clinkers, belite can incorporate larger amounts of minor elements and/or impurities than alite. For example, 4-6% can be substituted with other oxides such as $TiO_2$, $Al_2O_3$, $Fe_2O_3$, MgO, $K_2O$, and $SO_3$. In order to stabilize the most hydraulically active-belite polymorph (here the $\alpha'_H$-$C_2S$ polymorph), the addition of boron oxide (as borax here) has been investigated, as suggested by previous research.

Other patents have demonstrated the production of clinkers containing some belite (with different level of hydraulicity) and/or calcium sulfoaluminate using different starting materials:

- Gartner et al. demonstrated the production of a clinker containing mainly $C_4AF$ (5-25 wt. %), $C_4A_3$$ (15-35 wt. %), $C_2S$ (40-75 wt. %), and less than 10 wt. % of minor phases at firing temperatures of 1150 to 1350° C.
- Marchi et al. demonstrated the production of a clinker containing ye'elimite (more than 50 wt. %), belite (2-23 wt. %), and other clinker phases at firing temperature of 1200° C.
- Walenta et al. demonstrated the production of a high belite clinker with ferrite (5-30 wt. %), CSA (10-35 wt. %) and belite (40-75 wt. %) and other minor phases fired at 1300-1325° C.
- Tang et al. demonstrated the production of an activate-belite clinker with belite (88-94 wt, %), iron oxide (3-5 wt. %), sodium oxide (1-4 wt. % and potassium oxide (1-4 wt. %), fired at 1250-1450° C.

This document relates to the production of a clinker, containing mainly the hydraulically activate alpha'$_H$-belite polymorph and calcium sulfoaluminate (ye'elimite or $C_4A_3\acute{S}$), at the low firing temperature of 1050° C., using a combination of fluoride and boron oxide. This production solves the long-felt need for creating high strength cements at low firing temperatures of 1000-1050° C. (lower by 450-500° C. compared to Ordinary Portland cement (OPC), and lower by 200-250° C. compared to calcium sulfoaluminate (CSA) cement), thus reducing further the $CO_2$ emissions.

SUMMARY

This document describes the production of hydraulically activate $\alpha'_H$-belite-calcium sulfoaluminate clinker at extremely low firing temperature of 1050° C., when compared to current commercial binders, such as OPC (produced at 1450-1500° C.) or CSA cement (produced at 1250° C.).

In accordance with the purposes and benefits described herein, a new and improved raw meal of a cement clinker comprises, consists of or consists essentially of: about 45-57 weight percent calcium oxide; about 15-25 weight percent silicon dioxide; about 9-18 weight percent aluminum oxide; about 0.5-5 weight percent iron oxide; about 2-8 weight percent sulfur trioxide; about 0.2-3 weight percent calcium fluoride; about 0.2-4 weight percent sodium oxide; and about 0.5-5 weight percent boron oxide.

In one or more of the many possible embodiments, the raw meal includes at least one of limestone, hydrated lime, river sand, calcium sulfate, flue gas desulfurization (FGD) gypsum, fly ash, bauxite, red mud, calcium fluoride, borax, boric acid, and sodium oxide. In one or more of the many possible embodiments, the raw meal incorporates fluoride and boron oxide. In at least one particularly useful embodiment, the fluoride may be calcium fluoride and the boron oxide may be borax.

In one or more embodiments, the raw meal may include about 48-54 weight percent calcium oxide. In one or more embodiments, the raw meal may include about 18-22 weight percent silicon oxide. In one or more embodiments, the raw meal may include about 12-15 weight percent aluminum oxide. In one or more embodiments, the raw meal may include about 1.5-4 weight percent iron oxide. In one or more embodiments, the raw meal may include about 4.5-5 weight percent sulfur trioxide. In one or more embodiments, the raw meal may include about 1-1.5 weight percent calcium fluoride. In one or more embodiments, the raw meal may include about 1-2 weight percent sodium oxide. In one or more embodiments, the raw meal may include about 2-4 weight percent boron oxide.

In one particularly useful embodiment, the raw meal includes about 51-52 weight percent calcium oxide; about 19.5-21 weight percent silicon dioxide; about 13-14.5 weight percent aluminum oxide; about 2-3 weight percent iron oxide; about 4.5-5 weight percent sulfur trioxide; about 1.1-1.4 weight percent calcium fluoride; about 1.2-1.6 weight percent sodium oxide; and about 2.5-3.5 weight percent boron oxide.

In accordance with an additional aspect, a cement clinker is made from the raw material described in this document. Such a cement clinker may comprise about 40-70 weight percent hydraulically active belite polymorph; about 10-35 weight percent ye'elimite; and about 0-30 weight percent of at least one minor phase selected from a group consisting of beta-belite, gamma belite, alpha'$_L$-belite, tricalcium aluminate, ferrite, tetracalcium aluminoferrite, mayenite, fluorellestadite, fluormayenite, ternesite, gehlenite, krotite, alite, anhydrite, perovskite and free lime.

That cement clinker may include about 45-65 weight percent hydraulically active belite polymorph, about 15-30 weight percent ye'elimite and about 5-30 weight percent of at least one minor phase selected from a group consisting of beta-belite, gamma belite, alpha'$_L$-belite, tricalcium aluminate, ferrite, tetracalcium aluminoferrite, mayenite, fluorellestadite, fluormayenite, ternesite, gehlenite, krotite, alite, anhydrite, perovskite and free lime.

In accordance with yet another aspect, a new and improved process is provided for producing a cement clinker That process comprises the steps of: (a) preparing a raw meal of about 45-57 weight percent calcium oxide, about 15-25 weight percent silicon dioxide, about 9-18 weight percent aluminum oxide, about 0.5-5 weight percent iron oxide, about 2-8 weight percent sulfur trioxide, about 0.2-3 weight percent calcium fluoride, about 0.2-4 weight percent sodium oxide and about 0.5-5 weight percent boron oxide, (b) compacting and forming pellets from the raw meal, (c) calcining the pellets at about 900-1,000° C. for 15-60 minutes, (d) clinkering the pellets at 1,000-1300° C. for 15-60 minutes to produce clinkered pellets, and (e) quenching the clinkered pellets in air.

In one or more embodiments, the calcining of the pellets is performed at about 900-1,000° C. for 30-45 minutes. In one or more embodiments, the clinkering of the pellets is performed at 1,050-1150° C. for 15-45 minutes.

In the following description, there are shown and described several preferred embodiments of the (a) raw meal of a cement clinker, (b) the cement clinker made from the raw meal and the process for producing the cement clinker. As it should be realized, the raw meal, the cement clinker and the process are capable of other, different embodiments and their several details are capable of modification in various, obvious aspects all without departing from the raw meal, cement clinker and process as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein by reference and forming a part of the specification, illustrate several aspects of the raw meal and cement clinker and together with the description serve to explain certain principles thereof.

Figure 1:
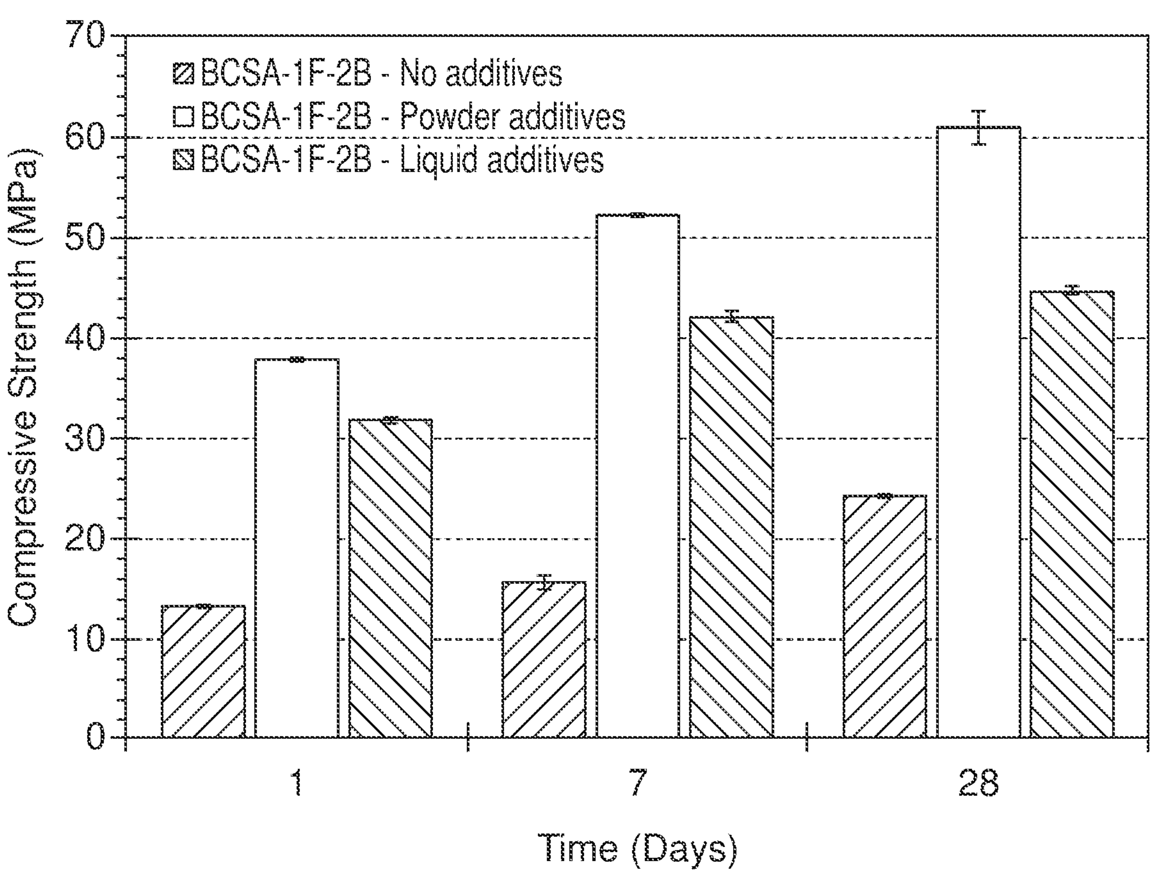
FIG. 1 is a graph illustrating compressive strength results of BCSA+10% anhydrite mortar samples with and without additives and/or admixtures.

Reference will now be made in detail to the present preferred embodiments of raw meal and cement clinker, examples of which are illustrated in the accompanying drawing figures.

DETAILED DESCRIPTION

As set forth herein, a raw meal of a cement clinker includes: (a) about 45-57 weight percent calcium oxide; (b) about 15-25 weight percent silicon dioxide; (c) about 9-18 weight percent aluminum oxide; (d) about 0.5-5 weight percent iron oxide; (e) about 2-8 weight percent sulfur trioxide; (f) about 0.2-3 weight percent calcium fluoride; (g) about 0.2-4 weight percent sodium oxide; and (h) about 0.5-5 weight percent boron oxide.

The raw materials for the preparation of the raw meal of the clinker can be from any sources, as long as the chemical composition is within the ranges described in the Table 1 below:

TABLE 1

Recommended, preferred, and most preferred chemical composition of the raw meal by weight percent

| | Recommended | Preferred | Most preferred |
|---|---|---|---|
| CaO | 45-57 | 48-54 | 51-52 |
| $SiO_2$ | 15-25 | 18-22 | 19.5-21 |
| $Al_2O_3$ | 9-18 | 12-15 | 13-14.5 |
| $Fe_2O_3$ | 0.5-5 | 1.5-4 | 2-3 |
| $SO_3$ | 2-8 | 4-5.5 | 4.5-5 |
| $CaF_2$ | 0.2-3 | 1-1.5 | 1.1-1.4 |
| $Na_2O$ | 0.2-4 | 1-2 | 1.2-1.6 |
| $B_2O_3$ | 0.5-5 | 2-4 | 2.5-3.5 |

The list of the raw materials can include limestone, hydrated lime, river sand, calcium sulfate (calcium anhydrite, calcium sulfate hemihydrate, calcium sulfate dihydrate), FGD gypsum, fly ash, bauxite, red mud, calcium fluoride, borax (anhydrous or not), boric acid, sodium oxide. This list is not exhaustive and other raw materials could be substituted.

Both fluoride (or as calcium fluoride) and boron oxide (or as borax) should be present within the raw meal for the production of the hydraulically activate polymorph of belite, alpha'$_H$-belite. In addition, the belite might not be completely alpha'$_H$ polymorph, but it might also include other polymorphs, such as beta-, gamma-, and alpha'$_L$-$C_2S$. The alpha'$_H$-belite should represent at least 75 wt. % of the total belite in the final clinker.

A cement clinker made from the raw material disclosed herein may include: (a) about 40-70 weight percent hydraulically active belite polymorph; (b) about 10-35 weight percent ye'elimite; and (c) about 0-30 weight percent of at least one minor phase selected from a group consisting of beta-belite, gamma belite, alpha'$_L$-belite, tricalcium aluminate, ferrite, tetracalcium aluminoferrite, mayenite, fluorellestadite, fluormayenite, ternesite, gehlenite, krotite, alite, anhydrite, perovskite and free lime.

More specifically, that cement clinker may include: (a) about 45-65 weight percent hydraulically active belite polymorph; (b) about 15-30 weight percent ye'elimite and (c) about 5-30 weight percent of at least one minor phase selected from a group consisting of beta-belite, gamma belite, alpha'$_L$-belite, tricalcium aluminate, ferrite, tetracalcium aluminoferrite, mayenite, fluorellestadite, fluormayenite, ternesite, gehlenite, krotite, alite, anhydrite, perovskite and free lime.

The production method for the activated-belite-calcium sulfoaluminate clinker disclosed in this document includes the following steps: (a) preparing a raw meal of about 45-57 weight percent calcium oxide, about 15-25 weight percent silicon dioxide, about 9-18 weight percent aluminum oxide, about 0.5-5 weight percent iron oxide, about 2-8 weight percent sulfur trioxide, about 0.2-3 weight percent calcium fluoride, about 0.2-4 weight percent sodium oxide and about 0.5-5 weight percent boron oxide; (b) compacting and forming pellets from the raw meal; (c) calcining the pellets at about 900-1,000° C. for about 15-60 minutes; (d) clinkering the pellets at about 1,000-1300° C. for about 15-60 minutes to produce clinkered pellets; and (e) quenching the clinkered pellets in air.

For compacting and forming, disk-pellets or a pelletization process can be used. In one possible embodiment the calcining of the pellets is performed at about 900-1,000° C. for about 30-45 minutes and the clinkering of the pellets is performed at about 1,050-1150° C. for about 15-45 minutes.

The final clinker should be finely ground with a final mean particle size distribution d(50) ranging from 5 to 20 μm, preferably between 6-15 μm. The final clinker should be mixed with a source of calcium sulfate (either calcium anhydrite, calcium hemihydrate, or calcium dihydrate). The optimal quantity of calcium sulfate should be determined by calorimetry studies, and/or calculated by taking into account all the clinker phases reacting with calcium sulfate during the hydration process. Admixtures of a type known in the art to be suitable for this purpose can also be added to the cement. Such admixtures include, for example, citric acid, lithium carbonate, naphthaienesulforiates, polycarboxylate, or lignosulfonate-based water reducers, and/or defoamers.

EXPERIMENTAL SECTION

Example 1: Preparation of a Hydraulic Activate-Alpha'$_H$-Belite-Calcium Sulfoaluminate Clinker with Both Fluoride and Boric Oxide in the Raw Meal The raw materials used for this example are all finely ground materials (with a d(50) below 20 μm) and include limestone, sand, FGD gypsum, fly ash, bauxite, calcium fluoride, and anhydrous borax, with their chemical compositions shown in Table 2, and their amounts detailed in Table 3.

TABLE 2

Chemical composition of the raw materials used for the production of activated-belite CSA clinker in wt. %

| Sample | $SiO_2$ | $Al_2O_3$ | $Fe_2O_3$ | CaO | MgO | $Na_2O$ | $K_2O$ | $P_2O_5$ | $TiO_2$ | $SO_3$ | F |
|---|---|---|---|---|---|---|---|---|---|---|---|
| Limestone | 0.7 | 0.33 | 0.16 | 97.25 | 0.53 | 0.01 | 0.03 | 0.04 | 0.01 | 0.57 | <0.01 |
| Fly Ash | 44.31 | 19.19 | 20.44 | 7.09 | 1.1 | 0.41 | 1.86 | 0.17 | 0.93 | 1.27 | 0.01 |
| FGD Gypsum | 2.77 | 0.4 | 0.22 | 40.3 | 0.24 | 0.01 | 0.08 | 0.01 | 0.01 | 53.46 | 0.01 |

TABLE 2-continued

Chemical composition of the raw materials used for the production of activated-belite CSA clinker in wt. %

| Sample | $SiO_2$ | $Al_2O_3$ | $Fe_2O_3$ | CaO | MgO | $Na_2O$ | $K_2O$ | $P_2O_5$ | $TiO_2$ | $SO_3$ | F |
|---|---|---|---|---|---|---|---|---|---|---|---|
| Sand | 97.55 | 0.22 | 0.52 | 0.11 | 0.02 | 0.01 | 0.01 | 0.01 | 0.01 | 0.01 | 0.01 |
| Bauxite | 15.2 | 72.77 | 5.38 | 1.42 | 0.04 | 0.01 | 0.15 | 0.07 | 2.19 | 0.29 | <0.1 |

TABLE 3

Raw materials and amounts (in wt. %) used for the production of activated-belite-CSA clinker

| Compositions | BCSA-1F-0B | BCSA-1F-2B |
|---|---|---|
| Limestone | 60.8 | 59.09 |
| Sand | 10.1 | 9.82 |
| FGD Gypsum | 8 | 7.77 |
| Fly ash | 5 | 4.86 |
| Bauxite | 15.2 | 14.77 |
| $CaF_2$ | 0.9 | 0.87 |
| Borax (anhydrous) | — | 2.82 |

The raw materials are blended in a ball mill until complete homogenization. The raw meal is then pressed into pellets (57×7 mm) with some deionized water (10 wt. %) and a pressure of 44 MPa. The pellets are dried in an oven overnight at 60° C.

The pellets are placed in a kiln on an alumina plate covered with zirconium oxide powder to avoid interaction with the alumina plate. The samples are clinkered at 1050-1100-1150-1250° C. for 60 minutes, quenched, and crushed in a shatter box for X-ray diffraction/Rietveld analyses. (Table 4)

Based on the Rietveld results shown in Table 4, it can be clearly seen why both fluoride and borax in the raw meal are needed. When only fluoride is present within the raw meal, no activated-belite is formed at any of the four clinkering temperatures tested. However, the addition of both fluoride and borax within the raw meal favors the formation of alpha'H-belite. Indeed, the contents of fluorellestadite, fluormayenite, and free lime are lowered with the presence of fluoride and borax. These three minerals previously mentioned should be as low as possible, as they decompose to produce belite and ye'elimite. But their presence is not detrimental to the final clinker composition. Indeed, the hydration reaction of fluorellestadite is faster than belite, estimated to be 80% after 300 days, when compared with belite estimated at 60% after 300 days.

TABLE 4

Final clinker composition of BCSA-1F-OB and BCSA-1F-2B at different firing temperatures

| | Compositions | | | | | | | |
|---|---|---|---|---|---|---|---|---|
| | 1F-0B | | | | 1F-2B | | | |
| | Firing Temperature (° C.) | | | | | | | |
| | 1050 | 1100 | 1150 | 1250 | 1050 | 1100 | 1150 | 1250 |
| $\alpha'_H$-$C_2S$ | 0.2 | 0.5 | — | — | 49.1 | 49.3 | 54.6 | 62.2 |
| β- $C_2S$ | 42.2 | 53.2 | 58.2 | 51.7 | 9.7 | 8.4 | 0.9 | 0 |
| γ- $C_2S$ | 0 | 0 | 2 | 7.7 | 2.7 | 2.7 | 2.1 | 1.1 |
| $\alpha'_L$-$C_2S$ | | — | 0 | — | 0 | 0 | 1.9 | 1.1 |
| $C_4A_3$\$-o | 8.5 | 16.5 | 21.4 | 22.7 | 15.3 | 17.6 | 18.9 | 18 |
| $C_4A_3$\$-c | 1 | 0 | 0.9 | 3.1 | 3.2 | 3.8 | 7.7 | 11.2 |
| $C_3A$-c | 0 | 0 | 0.7 | 0.5 | 0.4 | 0.9 | 1.8 | 2.8 |
| $C_4AF$ | 1.8 | 2.4 | 0.8 | 1.1 | 1.5 | 1.4 | 1 | 0.7 |
| $C_{12}A_7$ | 1 | 0.5 | 0.9 | 0.8 | 0.5 | 0 | 0 | 0 |
| Fluorellestadite | 17 | 13.9 | 11.3 | 10.7 | 4.5 | 1.3 | 0.7 | 0.6 |
| Fluormayenite | 11.6 | 9.9 | 3.6 | 1.7 | 4.1 | 2 | 0.7 | 0.7 |
| Ternesite | 2.5 | 1.5 | 0 | 0 | 2.4 | 1.8 | 2.2 | 0.8 |
| Gehlenite | 1.5 | 0 | 0 | 0 | 2.9 | 8.3 | 6.1 | 0.3 |
| Krotite | 1.5 | 0 | 0.1 | 0 | 2.6 | 1.7 | 1 | 0.6 |
| Anhydrite | 0.5 | 0 | 0.1 | 0 | 1.2 | 0.9 | 0.2 | 0 |
| CaO | 10.6 | 1.5 | 0 | 0 | 0 | 0 | 0 | 0 |
| Rwp | 6.58 | 4.84 | 6.13 | 5.57 | 8.16 | 7.61 | 5.34 | 4.43 |

Example 2: Influence of Fluoride and Borax in the Formation of Hydraulic Activate-Alpha'$_H$-Belite-Calcium Sulfoaluminate Clinker when Fired at 1050° C.

This example is similar to the example 1 with additional experiments and results. Samples without fluoride or borax (BCSA-0F-0B), with only fluoride (BCSA-1F-0B), with only borax (BCSA-0F-2B), and with both fluoride and borax (BCSA-1F-2B) were compared at firing temperature of 1050° C. for 60 minutes. The composition of the raw materials is presented in Table 5, and the final clinker compositions determined by Rietveld are presented in Table 6. Without any borax within the raw materials, the BCSA-0F-0B and BCSA-1F-0B compositions do not contain any $\alpha'_H$-belite within the final clinker, and contain significant amount of free lime (19.6 and 24.3 wt. %, respectively). With the addition of only borax within the raw materials, BCSA-0F-2B contains $\alpha'_H$-belite, but also some β-belite, γ-belite, CSA, gehlenite, and krotite. With the addition of both borax and fluoride, BCSA-1F-2B contains more $\alpha'_H$-belite, less β-belite, more CSA, less gehlenite, less krotite, and less anhydrite than BCSA-0F-2B.

TABLE 5

Raw materials and amounts (in wt. %) used for the production of non-activated & activated-belite-CSA clinker

| Compositions | BCSA-0F-0B | BCSA-1F-0B | BCSA-0F-2B | BCSA-1F-2B |
|---|---|---|---|---|
| Limestone | 61.35 | 60.80 | 59.61 | 59.09 |
| Sand | 10.19 | 10.10 | 9.90 | 9.82 |
| FGD Gypsum | 8.07 | 8.00 | 7.84 | 7.77 |
| Fly ash | 5.05 | 5.00 | 4.90 | 4.86 |

TABLE 5-continued

Raw materials and amounts (in wt. %) used for the production of non-activated & activated-belite-CSA clinker

| Compositions | BCSA-0F-0B | BCSA-1F-0B | BCSA-0F-2B | BCSA-1F-2B |
|---|---|---|---|---|
| Bauxite | 15.34 | 15.20 | 14.90 | 14.77 |
| $CaF_2$ | — | 0.90 | — | 0.87 |
| Borax (anhydrous) | — | — | 2.84 | 2.82 |

TABLE 6

Final clinker composition of BCSA-0F-0B, BCSA-1F-0B, BCSA-0F-2B, and BCSA-1F-2B fired at 1050° C. for 60 minutes

| | Compositions | | | |
|---|---|---|---|---|
| Firing Temp.(° C.) | 0F-0B 1050 | 1F-0B 1050 | 0F-2B 1050 | 1F-2B 1050 |
| $\alpha'_H$-$C_2S$ | — | — | 48.4 | 48.3 |
| β-C2S | 40.9 | 37.0 | 12.9 | 9.9 |
| γ-C2S | 0.1 | — | 5.1 | 5.6 |
| $\alpha'_L$-C2S | — | 1.6 | — | — |
| C4A3$-o | 6.9 | 2.4 | 14.7 | 15.7 |
| C4A3$-c | — | — | 1.1 | 1.1 |
| C3A-c | 0.8 | 0.2 | 1.1 | 1.0 |
| C4AF | 0.5 | 0.4 | 1.6 | 1.5 |
| C12A7 | 0.2 | — | — | — |
| Fluorellestadite | — | 14.7 | 1.2 | 5.7 |
| Fluormayenite | — | 10.8 | — | 2.2 |
| Ternesite | 1.3 | 1.3 | 1.1 | 1.8 |
| Gehlenite | 9.9 | 1.7 | 7.8 | 4.9 |
| Krotite | 3.1 | 2.1 | 3.4 | 1.6 |
| Anhydrite | 4.5 | 2.4 | 1.5 | 0.7 |
| CaO | 24.3 | 19.6 | — | — |
| $SiO_2$ | 7.5 | 5.8 | — | — |
| Rwp | 6.59 | 5.18 | 6.39 | 6.34 |

Example 3: Preparation and Properties of an Activated-Belite-CSA Cement

The activated-belite-CSA clinker from Example 1 was mixed with 10 wt. % anhydrite in a ball mill, as determined by calorimetry analyses.

Example 4: Mechanical Properties of an Activated-Belite-CSA Cement

Compressive strength tests on mortar samples were performed on the hydraulically activate-belite-CSA cement with 10% anhydrite from Examples 1 and 3, following ASTM C109, and are shown in Table 7. A water to cement ratio of 0.46 was used, and no admixtures were added to the mortar samples. The activated-belite-CSA cement exhibit high compressive strength outperforming the minimum required for any types of OPC described in ASTM C150.

TABLE 7

Compressive strength data

| | Compressive Strength (in MPa) | | |
|---|---|---|---|
| Cement | 1-day | 7-day | 28-day |
| BCSA-1F-2B-1100C | 13.7 | 21.3 | 27.0 |
| BCSA-1F-2B-1250C | 18.3 | 26.1 | 30.7 |

Example 5: Examples of Ways to Improve Compressive Strength Following ASTM C109

One way to improve compressive strength of BCSA+10 wt. % anhydrite is the use of additives and admixtures to mortar samples. This can include the use of powder water reducer, powder defoamer, liquid water reducer, and lithium carbonate. This list of admixtures and additives is not limited to the ones listed presently.

As shown in FIG. 1, the use of admixtures and additives, as described in Table 8, improves the compressive strength of BCSA+10% A by 2-3 times at 1, 7, and 28 days. In addition, it has been observed that the use of powder additives/admixtures is more effective than liquid additives/admixtures and can be considered depending on the final desired product.

TABLE 8

Compositions of BCSA + 10% A with and without admixtures and/or additives

| BCSA + 10% A | BCSA - No additives | BCSA - Powder additives | BCSA - Liquid additives |
|---|---|---|---|
| BCSA + 10% A | 500 g | 500 g | 500 g |
| ASTM C109 sand | 1375 g | 1375 g | 1375 g |
| Lithium carbonate | — | 0.09 g | 0.09 g |
| Powder defoamer | — | 1.0 g | — |
| Powder water reducer | — | 2.5 g | — |
| Liquid water reducer | — | — | 3.9 mL |
| DI Water | 221.3 g | 159.2 g | 159.2 g |

Figure 2:
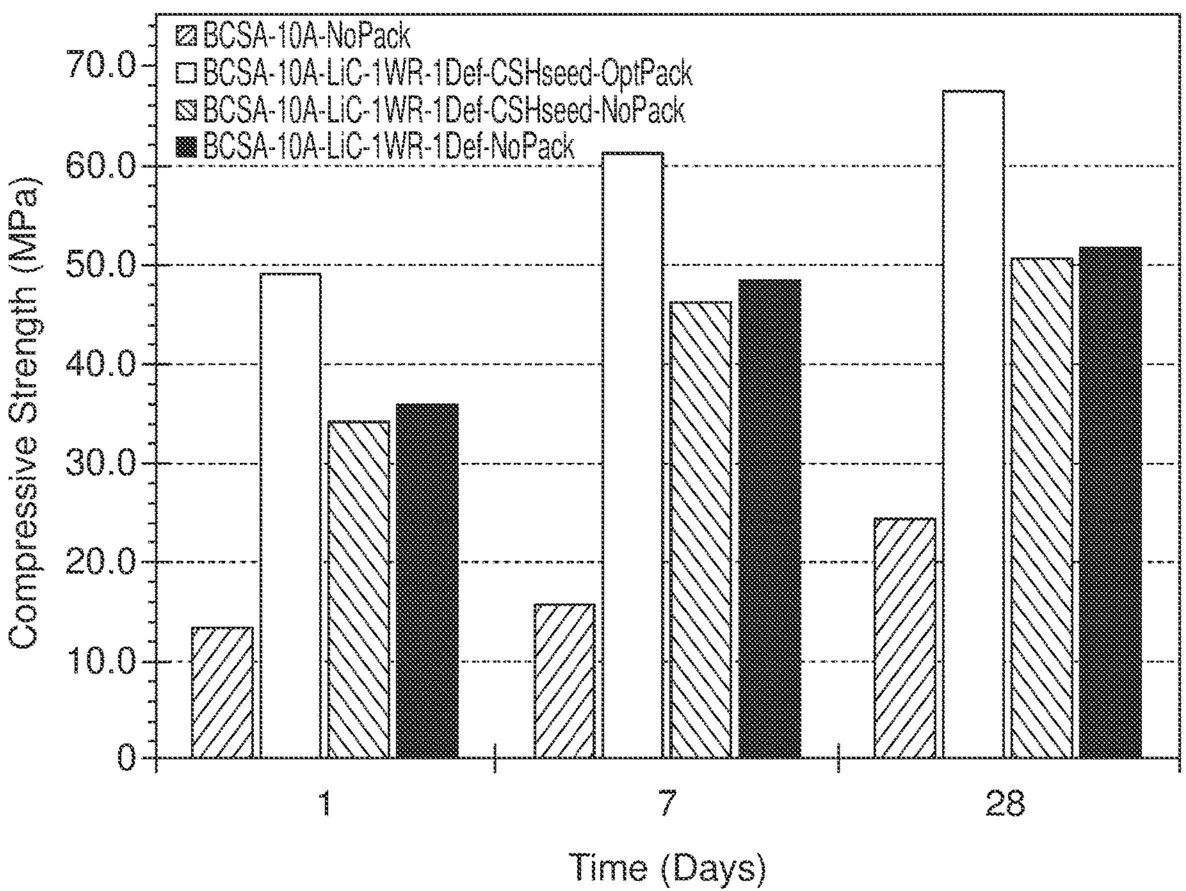
FIG. 2 is a graph illustrating compressive strength results of BCSA+10% anhydrite mortar samples with and without optimized particle packing, and with and without additives and/or admixtures.

Another way to improve compressive strength of BCSA+10% anhydrite is to optimize the particle packing of the mortar samples with or without the addition of admixtures. This particular example, show the use of an optimized particle (described in Table 9) and the use of powder water reducer, powder defoamer, C-S-H seeds, and lithium carbonate. As shown in FIG. 2, with the exact same additives added to the mortar samples, the optimized packing improve strength by 44%, 35% and 31%, at 1, 7, and 28 days, respectively.

TABLE 9

Compositions of BCSA + 10% A with and without optimized particle packing, and with and without additives

| BCSA + 10% A | No pack | +1.0WR + 1.0Def + CSH-Seed + LiC + OptPack | +1.0WR + 1.0Def + CSH-Seed + LiC + NoPack | +1.0WR + 1.0Def + LiC + NoPack |
|---|---|---|---|---|
| BCSA + 10% A | 500 g | 500 g | 500 g | 500 g |
| ASTM C109 sand | 1375 g | — | 1375 g | 1375 g |
| Lithium carbonate | — | 0.09 g | 0.09 g | 0.09 g |
| Powder defoamer | — | 5.0 g | 5.0 g | 5.0 g |
| Powder water reducer | — | 5.0 g | 5.0 g | 5.0 g |
| C—S—H seeds (liquid) | — | 3.10 mL | 3.10 mL | — |
| DI Water | 221.3 g | 159.2 g | 159.2 g | 159.2 g |
| Optimized Packing | No | Yes<br>18 × 35 500 g<br>35 × 60 150 g<br>60 × 120 350 g | No | No |

TABLE 9-continued

| Compositions of BCSA + 10% A with and without optimized particle packing, and with and without additives | | | | |
|---|---|---|---|---|
| BCSA + 10% A | No pack | +1.0WR + 1.0Def + CSH-Seed + LiC + OptPack | +1.0WR + 1.0Def + CSH-Seed + LiC + NoPack | +1.0WR + 1.0Def + LiC + NoPack |
| | | 120 × 230 150 g | | |
| | | −230 90 g | | |
| | | $SiO_2$-11 20 g | | |
| | | $SiO_2$-5 30 g | | |
| | | Fine Limestone 85 g | | |

Example 6: Examples of Ways to Improve Compressive Strength Following EN-196

Mortar prisms samples (40 mm×40 mm×160 mm) were produced with European sand, EN 196-1 following the EN-196:2016 procedures. These prisms were tested for both flexural and compressive strength on the same specimen. The compressive strength measurements were made according to ASTM C349 *"Standard Test Method for Compressive Strength of Hydraulic-Cement Mortars* (*Using Portions of Prims Broken in Flexure*)" in a test jig made for this application.

The prisms were prepared with a water cement ratio of 0.40, and a cement to sand ratio of 0.33. The effects of lithium carbonate ($Li_2CO_3$), a known strength accelerator in CSA cement and citric acid ($C_6H_8O_7$) a known retarder, were examined. The addition of 180 ppm of lithium carbonate and 1.0% of citric acid by weight of cement were investigated. The samples are labelled as follows: "amount of anhydrite added—addition of citric acid—addition of lithium carbonate", which would be "9.1% A-CA-LiC" for example.

Figure 3:
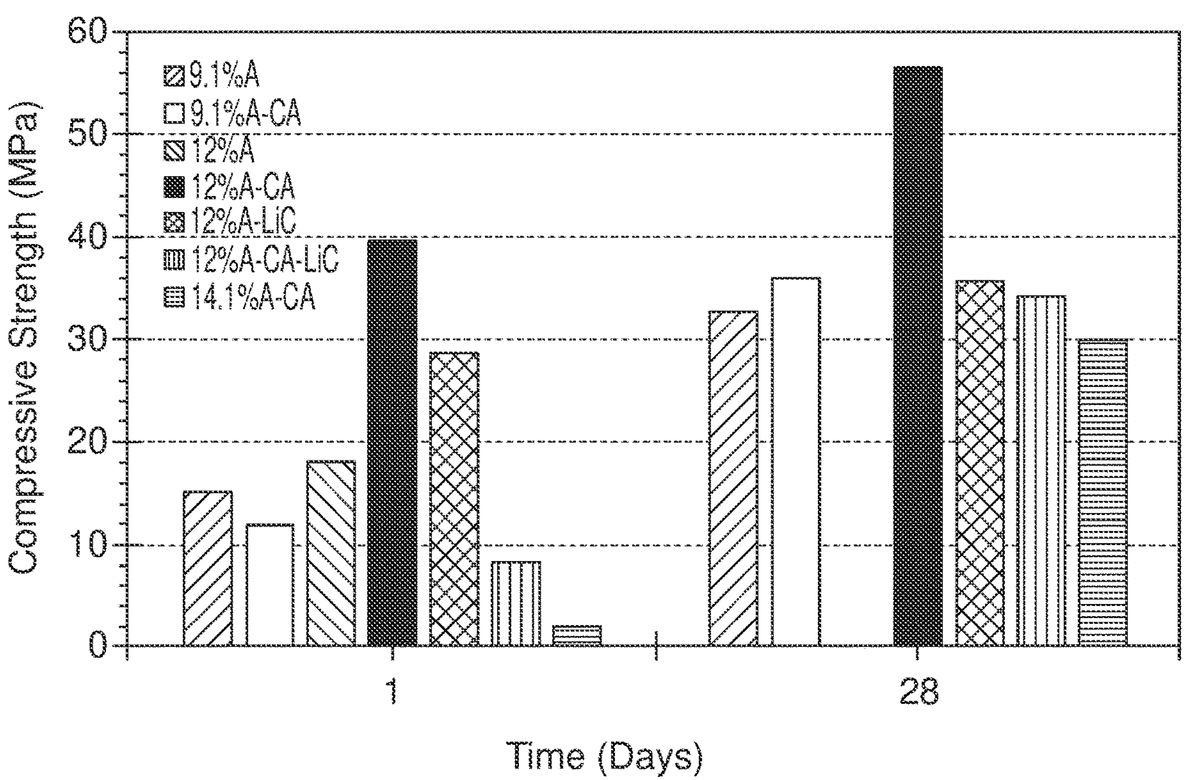
FIG. 3 is a graph illustrating compressive strength of EN-196 mortar samples with different amounts of anhydrite, citric acid and/or lithium carbonate.
Figure 4:
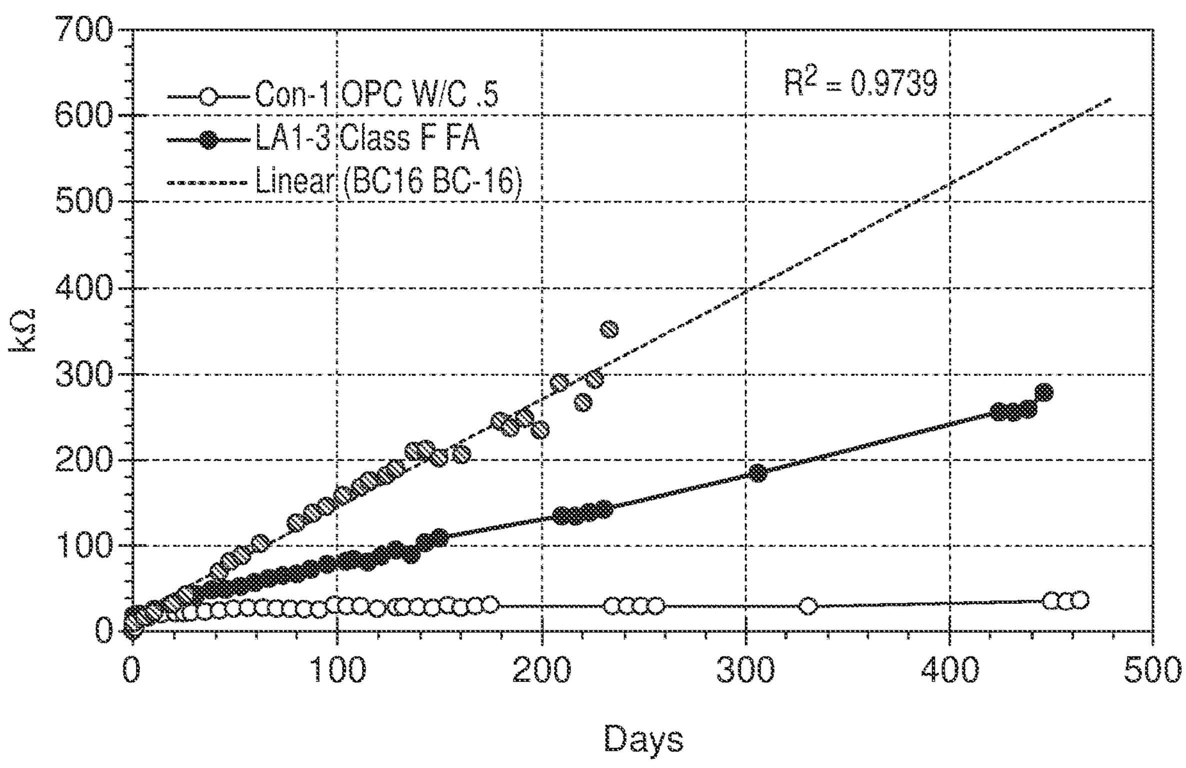
FIG. 4 is a graph illustrating long term resistivity trends for OPC control (Con-1 OPC), OPC with fly ash (LA1-3), and BCSA (BC-16) mortar samples.

FIG. 3 presents the compressive strength results for the BCSA samples with different amounts of anhydrite, citric acid and/or lithium carbonate after 1 and 28 days. The BCSA mortar samples were found to be stable with anhydrite additions of 9.1% by weight. Above this level, the prisms were found to fail due to excessive expansion. For example, the sample "9.1% A" was stable, while the sample "12% A" was found to expand. The addition of citric acid and/or lithium was found to stabilize the mix and allow extended contents of anhydrite without excessive expansion and with improved mechanical properties. "14.1% A-CA-LiC" sample which contained both citric acid and lithium carbonate is stable with an anhydrite concentration of 14.1%.

Example 7: Resistivity Data

Mortar prisms samples (40 mm×40 mm×160 mm) were produced with European sand following EN-196:2016. Resistivity measurements were performed based on AASHTO method T358-15 "Surface resistivity indication of concrete's ability to resist chloride ion penetration" and using a Werner probe instrument on the mortar samples.

The mortar prisms were prepared with a water: cement (w/c) ratio of 0.40, and a cement to sand ratio of 0.33. The compositions prepared for this example include an OPC sample as a control sample, an OPC with 25 wt. % class F fly ash (compliant with ASTM C618 specifications), and the BCSA+14.1 wt. % anhydrite. The compositions are presented in Table 10.

The long-term resistivity results for these three samples are presented in FIG. 3. The resistivity of BCSA is found to increase in a linear fashion over time exceeding values of 300 kΩ-cm in the first 8 months of measurement, exceeding that of OPC control. Indeed, the OPC control does not increase after about 20 to 40 days remaining flat for 15 months plotted. The OPC control at ~30 kΩ-cm after a period of 3 years. The resistivity of BCSA is much greater than an OPC fortified with a fly ash. For example, the LA3-1 prism reached a peak of about 275 kΩ-cm at 450 days, afterwards the trend in resistivity flatted out.

Although belite cement produces much less portlandite ($Ca(OH)_2$) than alite, these results at least suggest that the BCSA cement may be capable of activating a pozzolanic reaction with fly ash.

Resistivity measurements are related to chloride ion penetration (i.e., *"Surface Resistivity Indication of Concrete's Ability to Resist Chloride Ion Penetration"*). They are not directly related to strength, freeze thaw or other measurements related to durability. Based on this preliminary data, it does appear that the BCSA cement of this study will be capable of producing concrete of exceptional durability.

TABLE 10

| Composition of control OPC, fly ash/OPC, and BCSA mortar prism samples | | | |
|---|---|---|---|
| | Con-1 OPC | LA1-3 Class F FA | BC-16 |
| OPC | 450 g | 337.5 g | — |
| Class F fly ash | — | 112.5 g (25 wt. %) | — |
| BCSA clinker | — | — | 387 g |
| Anhydrite | — | — | 63 g |
| EN Sand | 1350 g | 1350 g | — |
| Lithium Carbonate | — | — | 180 ppm |
| Citric Acid | — | — | 4.5 g |
| Deionized Water | 225 | 225 | 180 g |

This disclosure may be said to relate to the following items.

1. A raw meal of a cement clinker, comprising:
about 45-57 weight percent calcium oxide;
about 15-25 weight percent silicon dioxide;
about 9-18 weight percent aluminum oxide;
about 0.5-5 weight percent iron oxide;
about 2-8 weight percent sulfur trioxide;
about 0.2-3 weight percent calcium fluoride;
about 0.2-4 weight percent sodium oxide; and
about 0.5-5 weight percent boron oxide.

2. The raw meal of item 1, further including at least one of limestone, hydrated lime, river sand, calcium sulfate, FGD gypsum, fly ash, bauxite, red mud, calcium fluoride, borax, boric acid, and sodium oxide.

3. The raw meal of item 1 incorporating fluoride and boron oxide.

4. The raw meal of item 3 wherein the fluoride is calcium fluoride and the boron oxide is borax.

5. The raw meal of item 4, including about 48-54 weight percent calcium oxide.

6. The raw meal of item 5, including about 18-22 weight percent silicon oxide.

7. The raw meal of item 6, including about 12-15 weight percent aluminum oxide.

8. The raw meal of item 7, including about 1.5-4 weight percent iron oxide.

9. The raw meal of item 8, including about 4.5-5 weight percent sulfur trioxide.

10. The raw meal of item 9, including about 1-1.5 weight percent calcium fluoride.

11. The raw meal of item 10, including about 1-2 weight percent sodium oxide.

12. The raw meal of item 11, including about 2-4 weight percent boron oxide.

13. The raw meal of item 1 including:
about 51-52 weight percent calcium oxide;
about 19.5-21 weight percent silicon dioxide;
about 13-14.5 weight percent aluminum oxide;
about 2-3 weight percent iron oxide;
about 4.5-5 weight percent sulfur trioxide;
about 1.1-1.4 weight percent calcium fluoride;
about 1.2-1.6 weight percent sodium oxide; and
about 2.5-3.5 weight percent boron oxide.

14. A cement clinker made from the raw meal of item 1.

15. A cement clinker, comprising:
about 40-70 weight percent hydraulically active belite polymorph;
about 10-35 weight percent ye'elimite; and
about 0-30 weight percent of at least one minor phase selected from a group consisting of beta-belite, gamma belite, alpha'$_L$-belite, tricalcium aluminate, ferrite, tetracalcium aluminoferrite, mayenite, fluorellestadite, fluormayenite, ternesite, gehlenite, krotite, alite, anhydrite, perovskite and free lime.

16. The cement clinker of item 15, including about 45-65 weight percent hydraulically active belite polymorph, about 15-30 weight percent ye'elimite and about 5-30 weight percent of at least one minor phase selected from a group consisting of beta-belite, gamma belite, alpha'$_L$-belite, tricalcium aluminate, ferrite, tetracalcium aluminoferrite, mayenite, fluorellestadite, fluormayenite, ternesite, gehlenite, krotite, alite, anhydrite, perovskite and free lime.

17. The cement clinker of items 15 or 16 wherein alpha $_H$-belite represents at least 75 weight perfect of total belite in the clinker.

18. A process for producing a cement clinker, comprising:
preparing a raw meal of about 45-57 weight percent calcium oxide, about 15-25 weight percent silicon dioxide, about 9-18 weight percent aluminum oxide, about 0.5-5 weight percent iron oxide, about 2-8 weight percent sulfur trioxide, about 0.2-3 weight percent calcium fluoride, about 0.2-4 weight percent sodium oxide and about 0.5-5 weight percent boron oxide;
compacting and forming pellets from the raw meal;
calcining the pellets at about 900-1,000° C. for about 15-60 minutes;
clinkering the pellets at about 1,000-1300° C. for about 15-60 minutes to produce clinkered pellets; and
quenching the clinkered pellets in air.

19. The process of item 18, including calcining the pellets at about 900-1,000° C. for about 30-45 minutes.

20. The process of item 19, including clinkering the pellets at about 1,050-1150° C. for about 15-45 minutes.

Each of the following terms written in singular grammatical form: "a", "an", and "the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a thermal reactor", and "a step", as used herein, may also refer to, and encompass, a plurality of thermal reactors and a plurality of steps, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step (s), and does not preclude addition of one or more additional component(s), feature(s), characteristic(s), parameter(s), integer(s), step(s), or groups thereof.

The phrase "consisting of", as used herein, is closed-ended and excludes any element, step, or ingredient not specifically mentioned. The phrase "consisting essentially of", as used herein, is a semi-closed term indicating that an item is limited to the components specified and those that do not materially affect the basic and novel characteristic(s) of what is specified.

Terms of approximation, such as the terms about, substantially, approximately, etc., as used herein, refers to ±10% of the stated numerical value.

Although the raw meal for making a cement clinker, the cement clinker made from that raw meal and the process for producing the cement clinker of this disclosure have been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

Numerous benefits and advantages result from the raw meal, cement clinker made from that raw meal and the process for producing the cement clinker. Key aspects include (a) extremely low firing temperature of 1050° C., (b) the presence of both alpha'$_H$-belite and ye'elimite at those low firing temperatures and (c) good strength and resistivity data.

Admixtures/additives, such as lithium carbonate, seeds of calcium silica hydrate C-S-H, optimized packing, dry or liquid water reducers and/or defoamers, may be added to improve compressive strength. Citric acid and/or lithium carbonate may be added to allow extended contents of anhydrite without excessive expansion and with improved mechanical properties. Mortar samples made from the cement clinker also exhibits superior chloride ion penetration resistance compared to commercial Portland cement and OPC/fly ash cement based on resistivity measurements indicating a potential for producing concrete of exceptional durability.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A raw meal of a cement clinker, comprising:
about 45-57 weight percent calcium oxide;
about 15-25 weight percent silicon dioxide;
about 9-18 weight percent aluminum oxide;
about 0.5-5 weight percent iron oxide;
about 2-8 weight percent sulfur trioxide;
about 0.2-3 weight percent calcium fluoride;

about 0.2-4 weight percent sodium oxide; and
about 0.5-5 weight percent boron oxide wherein the raw meal is adapted to produce a cement clinker with no more than 2.4 weight percent tetracalcium aluminoferrite.

2. The raw meal of claim 1, further including at least one of limestone, hydrated lime, river sand, calcium sulfate, flue gas desulfurization gypsum, fly ash, bauxite, red mud, calcium fluoride, borax, boric acid, and sodium oxide.

3. The raw meal of claim 1 incorporating fluoride and boron oxide.

4. The raw meal of claim 3 wherein the fluoride is calcium fluoride and the boron oxide is borax.

5. The raw meal of claim 4, including about 48-54 weight percent calcium oxide.

6. The raw meal of claim 5, including about 18-22 weight percent silicon oxide.

7. The raw meal of claim 6, including about 12-15 weight percent aluminum oxide.

8. The raw meal of claim 7, including about 1.5-4 weight percent iron oxide.

9. The raw meal of claim 8, including about 4.5-5 weight percent sulfur trioxide.

10. The raw meal of claim 9, including about 1-1.5 weight percent calcium fluoride.

11. The raw meal of claim 10, including about 1-2 weight percent sodium oxide.

12. The raw meal of claim 11, including about 2-4 weight percent boron oxide.

13. The raw meal of claim 1 including:
about 51-52 weight percent calcium oxide;
about 19.5-21 weight percent silicon dioxide;
about 13-14.5 weight percent aluminum oxide;
about 2-3 weight percent iron oxide;
about 4.5-5 weight percent sulfur trioxide;
about 1.1-1.4 weight percent calcium fluoride;
about 1.2-1.6 weight percent sodium oxide; and
about 2.5-3.5 weight percent boron oxide.

14. A cement clinker made from the raw meal of claim 1.

* * * * *